(12) United States Patent
Chen et al.

(10) Patent No.: US 9,594,232 B2
(45) Date of Patent: Mar. 14, 2017

(54) OPTICAL LENS

(71) Applicant: ABILITY ENTERPRISE CO., LTD., New Taipei (TW)

(72) Inventors: Jung-Yao Chen, New Taipei (TW); Yu-Min Chang, New Taipei (TW); Yen-Chen Chiang, New Taipei (TW)

(73) Assignee: ABILITY ENTERPRISE CO., LTD., New Taipei (TW)

( * ) Notice: Subject to any disclaimer, the term of this patent is extended or adjusted under 35 U.S.C. 154(b) by 0 days.

(21) Appl. No.: 14/794,266

(22) Filed: Jul. 8, 2015

(65) Prior Publication Data

US 2016/0011401 A1 Jan. 14, 2016

(30) Foreign Application Priority Data

Jul. 8, 2014 (TW) .............................. 103123447 A
May 6, 2015 (TW) .............................. 104114684 A

(51) Int. Cl.
*G02B 13/00* (2006.01)
*G02B 9/62* (2006.01)

(52) U.S. Cl.
CPC ............ *G02B 13/0045* (2013.01); *G02B 9/62* (2013.01)

(58) Field of Classification Search
CPC ....... G02B 13/18; G02B 13/0045; G02B 9/62
USPC .......................................... 359/713, 756, 757
See application file for complete search history.

(56) References Cited

U.S. PATENT DOCUMENTS

2013/0215520 A1* 8/2013 Lai .......................... G02B 13/18
                                                                 359/713
2014/0078603 A1* 3/2014 You .................... G02B 13/0045
                                                                 359/738

* cited by examiner

*Primary Examiner* — Scott J Sugarman
(74) *Attorney, Agent, or Firm* — Rabin & Berdo, P.C.

(57) ABSTRACT

This invention provides an optical lens, in order from an object side to an image-forming side, comprises a first lens with positive refraction power; a second lens with negative refraction power; a third lens with positive refraction power; a fourth lens with negative refraction power; a fifth lens with positive refraction power and a sixth lens with negative refraction power. The optical lens satisfies the following conditions: $0.50 \leq EFL/TTL$, $EFL/TTL \leq 1.00$, $0.65 \leq F123/EFL$, and/or $F123/EFL \leq 1.00$.

20 Claims, 12 Drawing Sheets

OPTICAL LENS

This application claims the benefit of Taiwan application Serial No. 103123447, filed Jul. 8, 2014, and the benefit of Taiwan application Serial No. 104114684, filed May 6, 2015, and the subject matters of which are incorporated herein by reference.

BACKGROUND

Technical Field

The present invention relates to an optical lens, especially to an optical lens with smaller volume and better image quality.

Description of the Related Art

Image-capturing devices, including but not limited to hand-held communication systems, digital cameras, digital camcorders, or sport camcorders, typically employ a lens module and an image sensor to gather light beams and turn the light beams into electrical signals of images for following image processing, storage, and transmitting.

The optical lens of an image-capturing device normally consists of several lenses. To increase competitive predominance in the market, size reduction, high image qualities, and reduced costs have been the target of product developments.

Therefore, it is in need to provide novel optical lenses having reduced sizes and good image qualities with reduced costs.

SUMMARY OF THE INVENTION

The present invention is to provide an optical lens having reduced size and good image quality with reduced cost.

One embodiment of the present invention provides an optical lens. The optical lens, in order from an object side to an image-forming side, comprises a first lens, a second lens, a third lens, a fourth lens, a fifth lens and a sixth lens. The first lens, the third lens and the fifth lens have the same light refractive effect, and the second lens, the fourth lens and the sixth lens have the same light refractive effect. In addition, the optical lens satisfies at least one of the following conditions: $0.50 \leq EFL/TTL$, $EFL/TTL \leq 1.00$, $0.65 \leq F123/EFL$ and $F123/EFL \leq 1.00$, wherein EFL is an effective focal length of the optical lens, TTL is a distance between an object-side surface of the first lens and an imaging plane, and F123 is a total focal length of the first lens, the second lens and the third lens.

Another embodiment of the present invention provides an optical lens. The optical lens, in order from an object side to an image-forming side, comprises a first lens having positive refractive power, a second lens having refractive power, a third lens having positive refractive power, a fourth lens having refractive power, a fifth lens having positive refractive power, and a sixth lens having negative refractive power. In addition, the optical lens satisfies at least one of the following conditions: $0.50 \leq EFL/TTL$, $EFL/TTL \leq 1.00$, $0.65 \leq F123/EFL$ and $F123/EFL \leq 1.00$, wherein EFL is an effective focal length of the optical lens, TTL is a distance between an object-side surface of the first lens and an imaging plane, and F123 is a total focal length of the first lens, the second lens and the third lens.

A further embodiment of the present invention provides an optical lens. The optical lens, in order from an object side to an image-forming side, comprises a first lens, a second lens, a third lens, a fourth lens, a fifth lens and a sixth lens. The first lens, the third lens and the fifth lens have the same light refractive effect, and the second lens, the fourth lens and the sixth lens have the same light refractive effect. In addition, the optical lens satisfies at least one of the following conditions: $0.50 \leq EFL/TTL$, $EFL/TTL \leq 1.00$, $0.65 \leq F123/EFL$ and $F123/EFL \leq 1.00$, wherein EFL is an effective focal length of the optical lens, TTL is a distance between an object-side surface of the first lens and an imaging plane, and F123 is a total focal length of the first lens, the second lens and the third lens. Moreover, the first lens is a glass lens, and at least one of the second lens, the third lens, the fourth lens, the fifth lens and the sixth lens is a plastic lens.

By the features described above, the present invention provides a zoom lens having light weight, high zoom ratio, and good image quality with reduced cost.

DETAILED DESCRIPTION OF THE INVENTION

Figure 1:
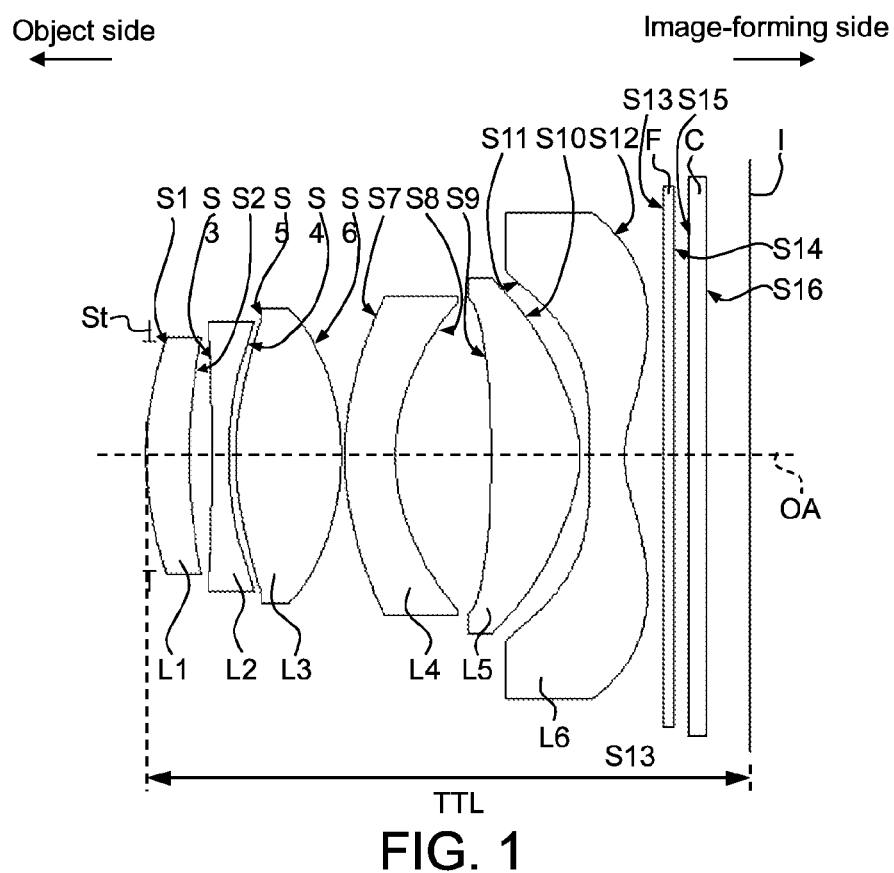
FIG. 1 shows an optical lens according the first embodiment of the present invention.

The embodiments of the present invention are described in details with reference to the accompanying drawings. While the invention will be described in conjunction with these specific embodiments, it will be understood that it is not intended to limit the invention to these embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well-known components and process operations are not described in detail in order not to unnecessarily obscure the present invention. Identical or similar elements of the embodiments are designated with the same or similar reference numerals. While drawings are illustrated in details, it is appreciated that the quantity or sizes of the disclosed components may be greater or less than that disclosed, except expressly restricting the amount or the sizes of the components.

FIG. 1 shows an optical lens OL1 according the first embodiment of the present invention. To highlight the features of the present embodiment, the drawings merely show components related to this embodiment, and the irrelevant or minor components are omitted. The optical lens OL1 of the present embodiment may be employed in a device capable of projecting or capturing images, wherein the device may be but not limited to a hand-held communication system, a car imaging lens, a monitoring system, a digital camera, a digital camcorder or a projector.

As shown in FIG. 1, in the present embodiment, the optical lens OL1, in order from an object side to an image-forming side, at least comprises a first lens L1, a second lens L2, a third lens L3, a fourth lens L4, a fifth lens L5 and a sixth lens L6. The first lens L1, the second lens 12, the third lens L3, the fourth lens L4, the fifth lens L5 and the sixth lens L6 may be arranged along an optical axis OA.

In another embodiment, the optical lens OL1 may mainly comprises a first lens group G1 and a second lens group G2. Furthermore, the first lens group G1 comprises at least one of the first lens L1, the second lens L2, the third lens L3, the fourth lens L4, the fifth lens L5 and the sixth lens L6, and the rest of the lenses may belong to the second lens group G2. The first lens group G1 may have positive refractive power, and the second lens group G2 may have negative refractive power.

For example, in order from the object side to the image-forming side, the first lens group G1, comprises the first lens L1, the second lens L2 and the third lens L3, and the second lens group G2 comprises the fourth lens L4, the fifth lens L5 and the sixth lens L6. However, the invention is not limited to the above-mentioned.

In an embodiment, the refractive powers of the first lens L1, the second lens L2, the third lens L3, the fourth lens L4, the fifth lens L5 and the sixth lens L6 may be alternatively arranged in a staggered fashion. In another embodiment, the first lens L1, the third lens L3 and the fifth lens L5 may have the same light refractive effect, and the second lens L2, the fourth lens L4, and the sixth lens L6 may have the same light refractive effect. Herein the same refractive effect indicates that the lenses all have positive values or negative values. That is, the lenses having positive refractive effect all may diverge passed lights, the lenses having negative refractive effect all may converge passed lights, and the level of the light divergence or the light convergence depend on each of the lenses.

For example, the first lens L1 has positive refractive power, the second lens L2 has negative refractive power, the third lens L3 has positive refractive power, the fourth lens L4 has negative refractive power, the fifth lens L5 has positive refractive power, and the sixth lens L6 has negative refractive power.

In an embodiment, the optical lens OL1 may satisfy the following conditions: 0.50≤EFL/TTL and/or EFL/TTL≤1.00, wherein EFL is an effective focal length of the optical lens OL1, and TTL is a distance between an imaging plane I and an object-side surface S1 of the first lens L1. Specifically speaking, TTL is a distance between the imaging plane I and a cross-point of the object-side surface S1 and the optical axis OA. Furthermore, the optical lens OL1 may satisfy 0.60≤EFL/TTL, and/or EFL/TTL≤0.93, or EFL/TTL≤0.85.

In an embodiment, the optical lens OL1 may also satisfy the conditions: 0.65 ≤F123/EFL and/or F123/EFL≤1.00, wherein F123 is a focal length of the first lens group G1; that is, F123 may be a total focal length of the first lens L1, the second lens L2 and the third lens L3. Furthermore, the optical lens Ol1 may also satisfy the conditions: 0.70≤F123/EFL and/or F123/EFL≤0.95.

In an embodiment, the optical lens OL1 may also satisfy the conditions: 1.30≤Fno and/or Fno≤2.80, wherein Fno is an F number of the optical lens OL1. Furthermore, the optical lens OL1 may also satisfy the conditions: 1.50≤Fno and/or Fno≤2.50.

In an embodiment, the optical lens OL1 may also satisfy the condition: TTL≤20.0 millimeters (mm). Furthermore, the optical lens OL1 may also satisfy the conditions: 5.0 mm≤TTL and/or TTL≤28.0 mm.

In an embodiment, the optical lens OL1 may also satisfy the condition: 1.40≤nd1, wherein nd1 is the refractive index of the first lens L1. Furthermore, the optical lens OL1 may also satisfy the conditions: 1.50≤nd1 and/or nd1≤2.00.

In an embodiment, the optical lens OL1 may also satisfy the condition: 35≤vd1, wherein vd1 is an Abbe number of the first lens L1. Furthermore, the optical lens OL1 may also satisfy the condition: vd1≤70.

In an embodiment, the optical lens OL1 may also satisfy the condition: vd4≤40, wherein vd4 is an Abbe number of the fourth lens L4. Furthermore, the optical lens OL1 may also satisfy the conditions: 10≤vd4 and/or vd4≤35.

In an embodiment, the optical lens OL1 may also satisfy the condition: |vd5−vd6|≤10, wherein vd5 is an Abbe number of the fifth lens L5, and vd6 is an Abbe number of the sixth lens L6.

In an embodiment, at least one of the first lens L1, the second lens L2, the third lens L3, the fourth lens L4, the fifth lens L5 and the sixth lens L6 is an aspheric lens or a free-form lens.

Specifically, each of the free-form lenses has at least one free-form surface; that is, an object-side surface and/or an image-side surface of the free-form lens are/is a free-form surface. Moreover, each of the aspheric lenses has at least one aspheric surface; that is, an object-side surface and/or an image-side surface of the aspheric lens are/is an aspheric surface. Each of the aspheric surfaces satisfies the following equation:

$$Z = \left[ \frac{(C*Y^2)}{1 + \sqrt{1 - (K+1)C^2Y^2}} \right] + \sum (A_i * Y^i)$$

where Z is the coordinate in the optical axis OA direction, and the direction in which light propagates is designated as positive; $A_4$, $A_6$, $A_8$, $A_{10}$, $A_{12}$, $A_{14}$, and $A_{16}$ are aspheric coefficients; K is coefficient of quadratic surface; C is reciprocal of R (C=1/R); R is the radius of curvature; Y is the coordinate in a direction perpendicular to the optical axis OA, in which the upward direction away from the optical axis OA is designated as positive. In addition, each of the parameters or the coefficients of the equation of each of the aspheric lenses may be predetermined to determine the focal length of each of the aspheric lenses.

In another embodiment, the first lens L1, the second lens L2, the third lens L3, the fourth lens L4, the fifth lens L5 and the sixth lens L6 may all be free-form lenses, or may be aspheric lenses and free-form lenses, separately. Alternatively, at least one of the first lens L1, the second lens L2, the third lens L3, the fourth lens L4, the fifth lens L5 and the sixth lens L6 has both of an aspheric surface and a free-form surface, but not limited thereto.

In a further embodiment, the first lens L1, the second lens L2, the third lens L3, the fourth lens L4, the fifth lens L5 and the sixth lens L6 may all be aspheric lenses. For example, the first lens L1, the second lens L2, the third lens L3, the fourth lens L4, the fifth lens L5 and the sixth lens L6 are aspheric lenses having object-side surfaces and image-side surfaces being aspheric surfaces.

In addition, in an embodiment, the first lens L1 may be a glass lens made of a glass material; at least one of the second lens L2, the third lens L3, the fourth lens L4, the fifth lens L5 and the sixth lens L6 may be a plastic glass made of a plastic material or a glass lens made of a glass material. The plastic material may include, but not limited to, polycarbonate, cyclic olefin copolymer (e.g. APEL), polyester resins (e.g. OKP4 or OKP4HT), and the like, or a mixture material including at least one of the above-mentioned three materials.

In an embodiment, the object-side surface S1 of the first lens L1 and/or the image-side surface S2 of the first lens L1 may be aspheric. The object-side surface S1 may have positive refractive power, and the image-side surface S2 may have refractive power, such as positive refractive power or negative refractive power.

As shown in FIG. 1, the object-side surface S1 of the first lens L1 may be a convex surface protruded toward the object side and has positive refractive power. The image-side surface S2 may be a concave surface indented toward the object side and has positive refractive power. Furthermore, the first lens L1 may be a lens having positive refractive power including but not limited thereto a convex-concave lens having positive refractive power.

Figure 2:
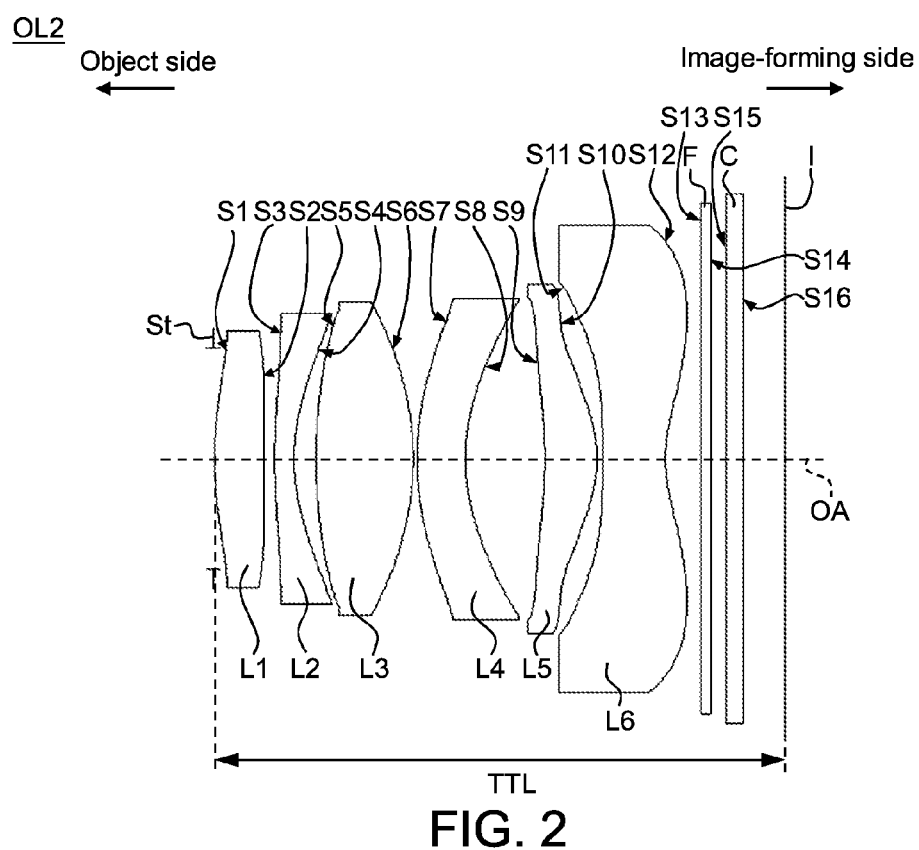
FIG. 2 shows an optical lens according the second embodiment of the present invention.

FIG. 2 shows an optical lens OL2 according the second embodiment of the present invention. The structure of the present optical lens L2 is about the same as that of the optical lens OL1 and mostly applies the same terms and labellings for the same components.

As shown in FIG. 2, the image-side surface S2 of the first lens L1 may be a concave surface protruded toward the image-forming side and has negative refractive power. In other words, the first lens L1 may be a double convex lens having positive refractive power.

In an embodiment, the object-side surface S3 and the image-side surface S4 of the second lens L2 may both be aspheric. The object-side surface S3 may have refractive power, such as negative power or positive power, and the image-side surface S4 may have positive refractive power.

As shown in FIGS. 1 and 2, the object-side surface S3 of the second lens L2 of the optical lens OL1 may be a concave surface indented toward the image-forming side and has negative refractive power, and the object-side surface S3 of the second lens L2 of the optical lens OL2 may be a convex surface protruded toward the object side and has positive refractive power. The image-side surfaces S4 of the optical lens OL1 and the optical lens OL2 are both concave surfaces indented toward the object side and have positive refractive power. Furthermore, the second lens L2 may be a lens having negative refractive power, including but not limited thereto a double concave lens having negative refractive power or a convex-concave lens having negative refractive power.

Refer to FIGS. 1 and 2. In an embodiment, the object-side surface S5 and/or the image-side surface S6 of the third lens L3 may be aspheric surface(s). The object-side surface S5 may be a convex surface protruded toward the object side and has positive refractive power, and the image-side surface S6 may be a convex surface protruded toward the image-forming side and has negative refractive power. The third lens L3 may be a lens having positive refractive power, including but not limited thereto a double convex lens having positive refractive power.

In an embodiment, the object-side surface S7 and/or the image-side surface S8 of the fourth lens L4 may be aspheric surface(s). The object-side surface S7 may be a convex surface protruded toward the object side and has positive refractive power, and the image-side surface S8 is a concave surface indented toward the object side and has positive refractive power. The fourth lens L4 may be a lens having negative refractive power, including but not limited thereto a convex-concave lens having negative refractive power.

In an embodiment, the object-side surface S9 and/or the image-side surface S10 of the fifth lens L5 may be aspheric surface(s). The object-side surface S9 may be a concave surface indented toward the image-forming side and has negative refractive power, and the image-side surface S10 may be a convex surface protrude toward the image-forming side and has negative refractive power. The fifth lens L5 may be a lens having positive refractive power, including but not limited thereto a concave-convex lens having positive refractive power.

In an embodiment, the object-side surface S11 and/or the image-side surface S12 of the sixth lens L6 may be aspheric surface(s). The object-side surface S11 may be a concave surface indented toward the image-forming side and has negative refractive power, and the image-side surface S12 may be a concave surface indented toward the object side and has positive refractive power. The sixth lens L6 may be a lens having negative refractive power, including but not limited to a double concave lens having negative refractive power.

In addition, as shown in FIGS. 1 and 2, while the image-side surface 12 of the sixth lens L6 is aspheric, the surface 12 may include an infection point IF, wherein a distance between the infection point IF and the optical axis OA is h6, the sixth lens L6 has a radius H6, and the optical lenses OL1 and OL2 satisfy the condition: h6/H6<1.0. Furthermore, the optical lenses OL1 and OL2 may satisfy the conditions: $0.40 \leq h6/H6$ and/or $h6/H6 \leq 0.75$.

In another embodiment, h6 may be a minimum distance or a vertical distance between the infection point IF and the optical axis OA, and H6 may be a distance between the outside diameter of the sixth lens L6 and the optical axis OA, such as a minimum distance or a vertical distance.

In a further embodiment, the infection point IF may be located at a position on the image-side surface S12 of the sixth lens L6, which position is closest to the imaging plane I. In a still further embodiment, H6 may be defined as the effective aperture or the mechanical aperture of the sixth lens L6, or may be defined as the light beam outside diameter of the sixth lens L6 as well.

Moreover, as shown in FIGS. 1 and 2, the optical lenses OL1 and OL2 may further include a stop St and a filter F. The stop S may be arranged on the object side of the first lens L1, and may be arranged between any two lenses L1-L6; alternatively, the stop St may be arranged between the sixth lens L6 and the imaging plane I. The filter F may be arranged between the sixth lens L6 and the imaging plane I. The filter F may be an infrared light filter. In addition, a photoelectric converting unit or an image capturing unit may be disposed on the imaging plane I for detecting light beams passing through the optical lenses OL1 and OL2. Moreover, the optical lenses OL1 and OL2 may further include a protection plate C, which may be arranged between the imaging plane I and the filter F. In an alternative embodiment, the protection plate C may be integrated into the filter F for reducing the cost as well as the thickness of the arrangement of the protection plate C. However, the optical lenses OL1 and OL2 are not limited to the above-mentioned.

Table 1 lists the detail information of the optical lens OL1 according to an embodiment of this invention. The detail information includes the effective focal length, the curvature radius, the thickness, the refractive index, and the Abbe number of each of the lenses, where the surface numbers are sequentially ordered from the object side to the image-forming side. For example, "S1" stands for the object-side surface of the first lens L1, "S2" stands for the image-side surface of the first lens L1, "S" stands for the surface of the stop St, "S13" and "S14" respectively stand for the object-side surface and the image-side surface of the filter F, and "S15" and "S16" respectively stand for the object-side surface and the image-side surface of the protection plate C. In addition, the "thickness" stands for the distance between an indicated surface and an adjacent surface close to the image-forming side. For example, the thickness of the surface S1 is the distance between the surface S1 and the surface S2, and the thickness of the surface S2 is the distance between the surface S2 and the surface S3.

Figure 3:
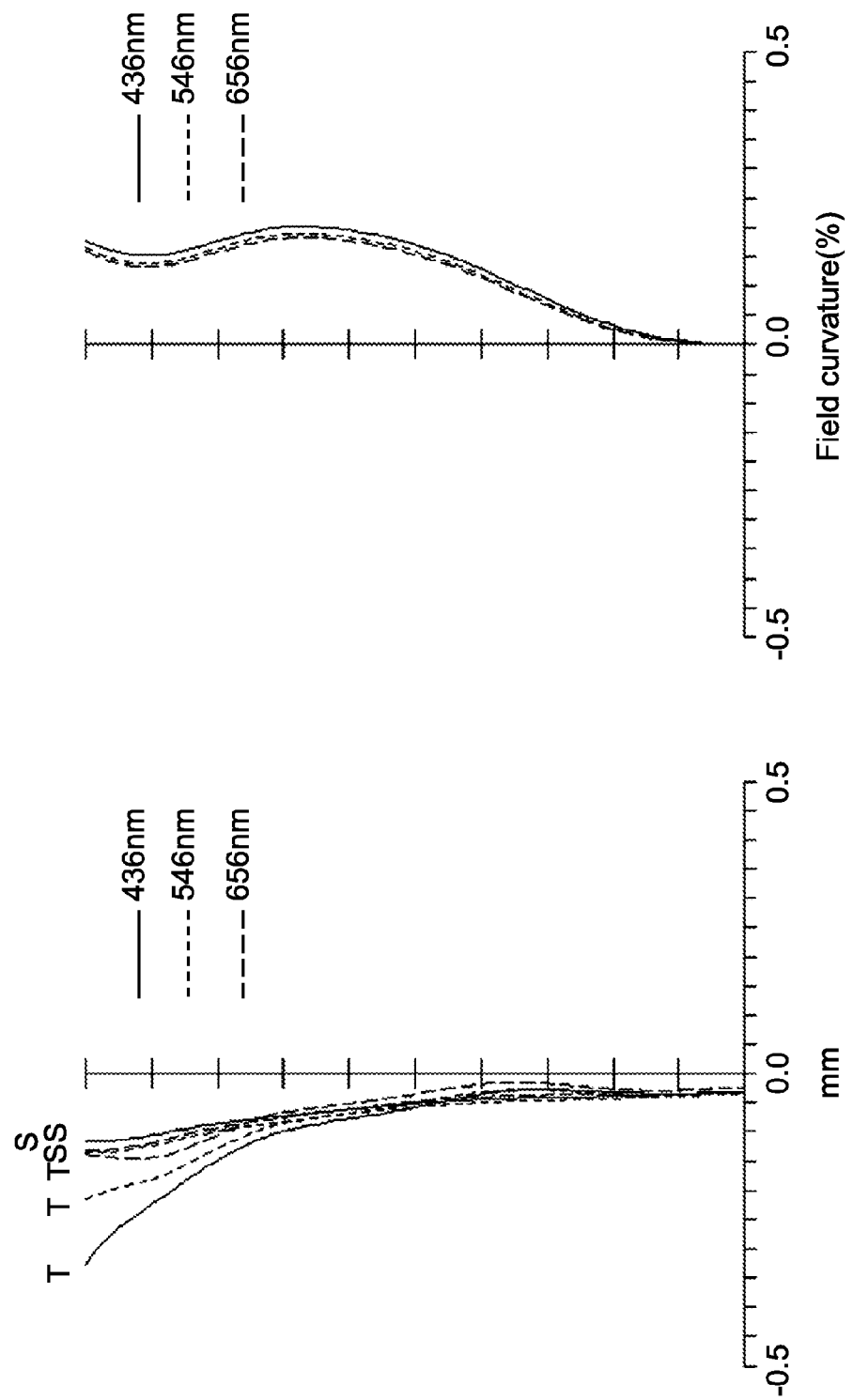
FIG. 3A and FIG. 3B show a field curvature chart and a distortion chart of the optical lens according to the first embodiment of the present invention respectively.

FIG. 3A shows the field curvature chart of the optical lens OL1. The curves T and S stand for the aberration of the optical lens OL1 to the tangential rays and the sagittal rays. As shown in the drawing, the tangential values and the sagittal values of light beams with wavelengths of 436 nm, 546 nm, and 656 nm are all controlled within favorable ranges.

FIG. 3B shows the distortion chart of the optical lens OL1. As shown in the drawing, the distortion values for light beams with wavelengths of 436 nm, 546 nm, and 656 nm are all set in the range of (−0.5%, +0.5%).

Figure 4:
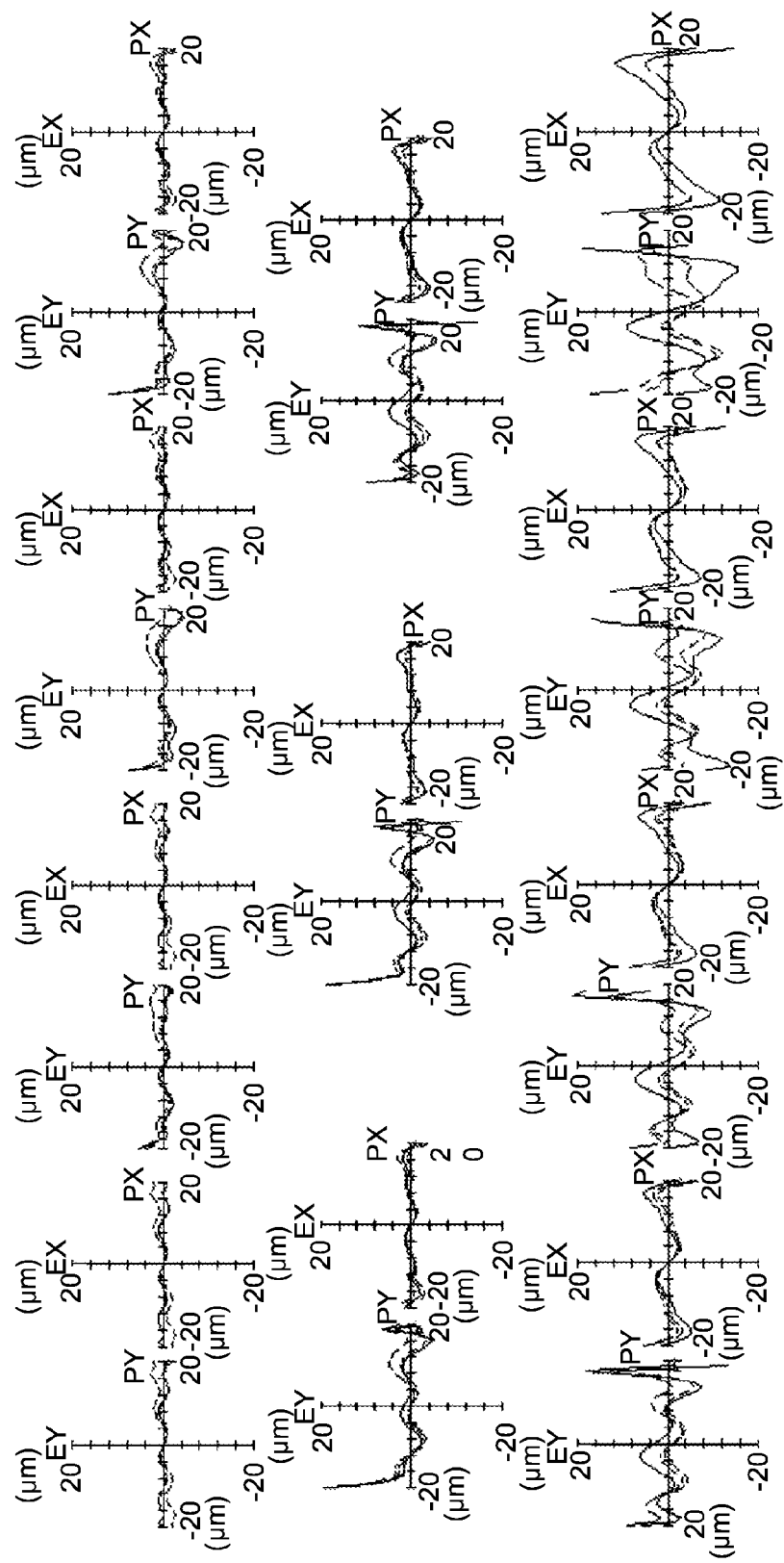
FIG. 4 shows a ray fan simulation chart of the optical lens according to the first embodiment of the present invention.

FIG. 4 shows a ray fan simulation chart of the optical lens OL1. The simulation data are obtained according to different image heights Y with light beams having three different wavelengths of 436 nm, 546 nm, and 656 nm.

Table 3 lists the detail information of the optical lens OL2 according to an embodiment of this invention. If any one of the object-side surfaces S1, S3, S5, S7, S9 and S11 and the image-side surfaces S2, S4, S6, S8, S10 and S12 of the first lens L1 to the sixth lens L6 of the optical lens OL2 is aspheric, and the aspheric coefficients of the above-mentioned surfaces may be listed as indicated in table 4.

TABLE 1

| Effective focal length | Lens | Surface number | Curvature radius (mm) | Thickness (mm) | Refractive index | Abbe number |
|---|---|---|---|---|---|---|
| | | S | ∞ | 0.1 | | |
| 24.15 | L1 | S1 | 8.538 | 1.17 | 1.85 | 40 |
| | | S2 | 13.616 | 0.64 | | |
| −13.7 | L2 | S3 | −37.808 | 0.45 | 1.61 | 26.65 |
| | | S4 | 10.837 | 0.2 | | |
| 7.33 | L3 | S5 | 8.223 | 2.89 | 1.535 | 57 |
| | | S6 | −6.619 | 0.1 | | |
| −23.19 | L4 | S7 | 7.736 | 1.37 | 1.64 | 24 |
| | | S8 | 4.735 | 2.67 | | |
| 6.4 | L5 | S9 | −27.026 | 2.44 | 1.535 | 57 |
| | | S10 | −3.136 | 0.27 | | |
| −5.2 | L6 | S11 | −93.453 | 0.95 | 1.535 | 57 |
| | | S12 | 2.897 | 1.05 | | |
| | F | S13 | ∞ | 0.3 | 1.5233 | 54.517 |
| | | S14 | ∞ | 0.4 | | |
| | C | S15 | ∞ | 0.5 | 1.5167 | 64.167 |
| | | S16 | ∞ | 1.2 | | |
| | | I | ∞ | | | |

Furthermore, if any one of the object-side surfaces S1, S3, S5, S7, S9 and S11 and the image-side surfaces S2, S4, S6, S8, S10 and S12 is aspheric, and the aspheric coefficients of the above-mentioned surfaces may be listed as indicated in table 2.

TABLE 3

| Effective focal length | Lens | Surface number | Curvature radius (mm) | Thickness (mm) | Refractive index | Abbe number |
|---|---|---|---|---|---|---|
| | | S | ∞ | 0.03 | | |
| 12.26 | L1 | S1 | 10.927 | 1.411 | 1.85 | 40 |
| | | S2 | −249.9 | 0.3 | | |
| −11.9 | L2 | S3 | 17.968 | 0.55 | 1.64 | 24 |
| | | S4 | 5.297 | 0.611 | | |
| 9.86 | L3 | S5 | 14.966 | 2.77 | 1.535 | 57 |
| | | S6 | −7.645 | 0.1 | | |
| −29.2 | L4 | S7 | 7.92 | 1.37 | 1.64 | 24 |
| | | S8 | 5.19 | 2.29 | | |
| 8.12 | L5 | S9 | −13.044 | 1.49 | 1.535 | 57 |
| | | S10 | −3.398 | 0.15 | | |
| −6.57 | L6 | S11 | −50.21 | 1.78 | 1.535 | 57 |
| | | S12 | 3.84 | 1.01 | | |
| | F | S13 | ∞ | 0.3 | 1.5233 | 54.517 |
| | | S14 | ∞ | 0.4 | | |
| | C | S15 | ∞ | 0.5 | 1.5167 | 64.167 |
| | | S16 | ∞ | 1.2 | | |
| | | I | ∞ | | | |

TABLE 2

| | K | A4 | A6 | A8 | A10 | A12 | A14 |
|---|---|---|---|---|---|---|---|
| S1 | −9.61 | 0.0012 | −9.595e−5 | 6.236e−6 | −3.756e−7 | 1.425e−8 | 0 |
| S2 | 0 | −0.000854 | −4.1834e−5 | 1.7561e−5 | −1.3581e−6 | 3.62e−8 | 0 |
| S3 | −44.74554 | 0.001193 | −9.144e−5 | 6.472e−6 | −4.15e−7 | −1.2525e−8 | 0 |
| S4 | 2.981823 | 0.001234 | −6.816e−5 | −3.177e−6 | 2.980e−8 | 1.719e−9 | 0 |
| S5 | 0 | −0.001038 | −2.470e−5 | 3.5952e−6 | −2.063e−7 | 3.568e−9 | 0 |
| S6 | −10.5108 | −0.00303 | 0.0001286 | −8.939e−6 | 3.2e−7 | −6.6e−9 | 0 |
| S7 | −1.021439 | −0.0009023 | 4.1594e−5 | −2.4416e−7 | −6.682e−9 | −8.021e−10 | 0 |
| S8 | −5.519108 | 0.002447086 | −0.00012675082 | 8.0085112e−6 | −2.1787441e−7 | 1.8467446e−9 | 0 |
| S9 | −3.885656 | 0.0003165 | −0.0001261 | 1.1283e−5 | −6.9186e−7 | 1.8303e−8 | −1.866e−010 |
| S10 | −6.748573 | −0.001632 | −0.00014 | 2.298e−5 | −1.294e−6 | 2.536e−8 | −3.213e−11 |
| S11 | 0 | −0.0055 | −0.000169 | 4.7655e−5 | −3.2e−6 | 9.046e−8 | −8.894e−10 |
| S12 | −7.198051 | −0.00434 | 0.0002174 | −7.4581e−6 | 1.324e−7 | −1.03253e−9 | 1.2604e−12 |

TABLE 4

| | K | A4 | A6 | A8 | A10 | A12 | A14 | A16 |
|---|---|---|---|---|---|---|---|---|
| S1 | −14.77751 | 0.000616513 | −0.0001022 | 1.06e−7 | 5.37e−8 | −7.16e−9 | 4.77e−10 | 0 |
| S2 | 0 | 0.001057971 | −0.0002778 | 1.77e−5 | −8.70e−7 | 2.22e−8 | 3.00e−10 | 0 |
| S3 | 9.981192 | −0.001221668 | −0.000116 | 1.49e−5 | −9.76e−7 | 2.86e−8 | 7.47e−11 | 0 |
| S4 | −4.36996 | −0.000905178 | 5.043e−5 | 3.67e−7 | −2.16e−7 | 6.32e−9 | 5.66e−11 | 0 |
| S5 | −5.040972 | 0.000260241 | −7.08e−5 | 7.68e−6 | −3.47e−7 | 1.03e−8 | −1.59e−10 | 0 |
| S6 | −13.42125 | −0.001954462 | 0.0001266 | −7.81e−6 | 2.20e−7 | −2.07e−9 | 1.64e−11 | 0 |
| S7 | −1.730793 | −0.000992721 | 6.701e−5 | −2.35e−6 | 3.47e−8 | −9.51e−10 | 3.41e−11 | −2.3e−12 |
| S8 | −6.222496 | 0.001496533 | −0.0001122 | 8.65e−6 | −3.83e−7 | 7.01e−9 | 8.39e−11 | −4.7e−12 |
| S9 | −2.085693 | 0.002514296 | −0.000277 | 2.98e−5 | −1.67e−6 | 4.52e−8 | −6.51e−10 | 3.85e−15 |
| S10 | −5.536593 | −0.000487966 | −5.094e−5 | 2.02e−5 | −1.01e−6 | 1.85e−8 | −1.89e−10 | 8.25e−13 |
| S11 | 0 | −0.002302029 | −0.000274 | 5.09e−5 | −3.63e−6 | 1.26e−7 | −1.72e−9 | −9.4e−13 |
| S12 | −8.788302 | −0.00282851 | 0.0001279 | −4.40e−6 | 8.29e−8 | −7.83e−10 | 2.41e−12 | −1.0e−14 |

Figures 5A, 5B:
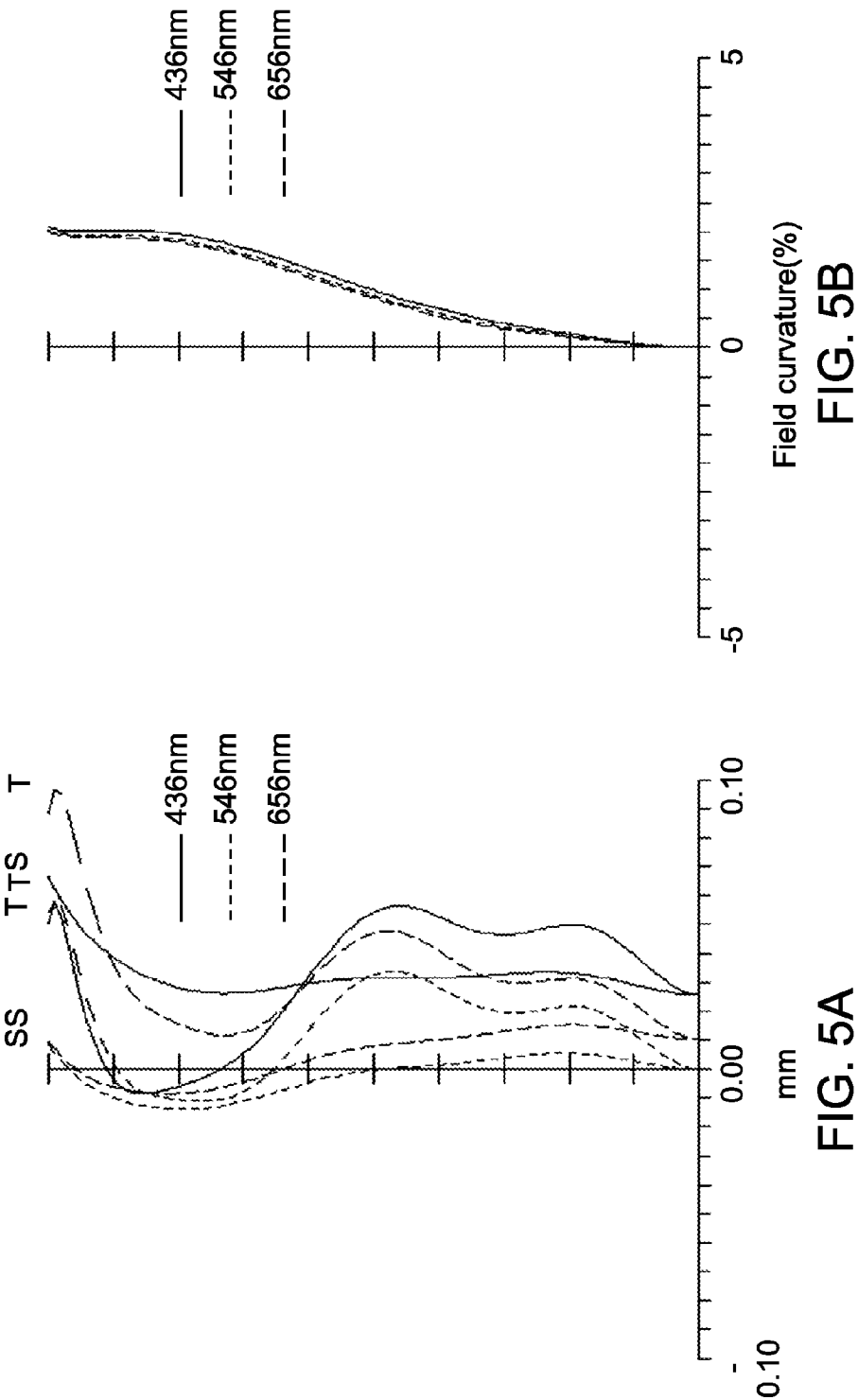
FIG. 5A and FIG. 5B show a field curvature chart and a distortion chart of the optical lens according to the second embodiment of the present invention respectively.

FIG. 5A shows the field curvature chart of the optical lens OL2. The curves T and S stand for the aberration of the optical lens OL2 to the tangential rays and the sagittal rays. As shown in the drawing, the tangential values and the sagittal values of light beams with wavelengths of 436 nm, 546 nm, and 656 nm are all controlled within favorable ranges.

FIG. 5B shows the distortion chart of the optical lens OL2. As shown in the drawing, the distortion values for light beams with wavelengths of 436 nm, 546 nm, and 656 nm are all set in the range of (−0.5%, +0.5%).

Figure 6:
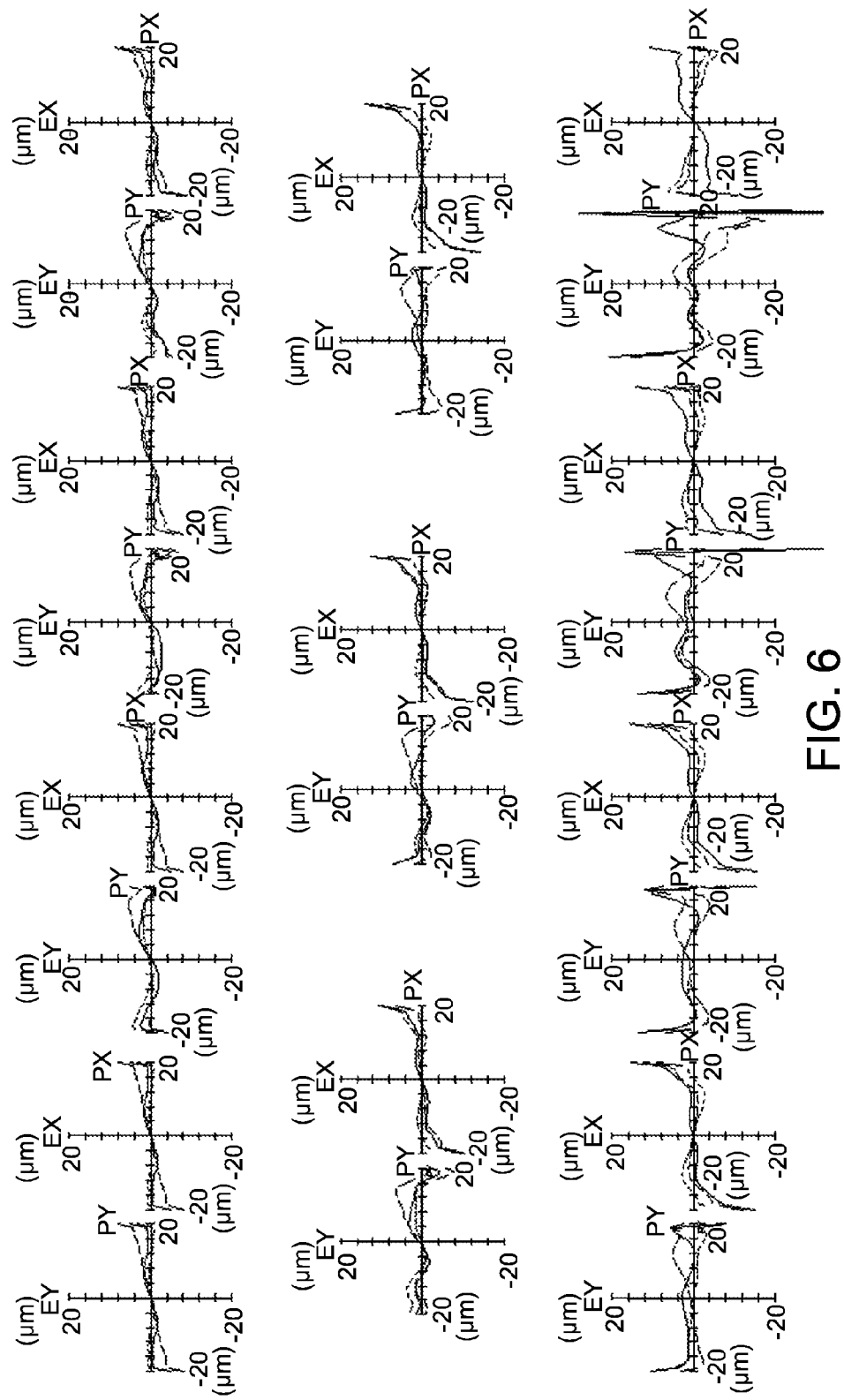
FIG. 6 shows a ray fan simulation chart of the optical lens according to the second embodiment of the present invention.

FIG. 6 shows a ray fan simulation chart of the optical lens OL2. The simulation data are obtained according to different image heights Y with light beams having three different wavelengths of 436 nm, 546 nm, and 656 nm.

Figure 7:
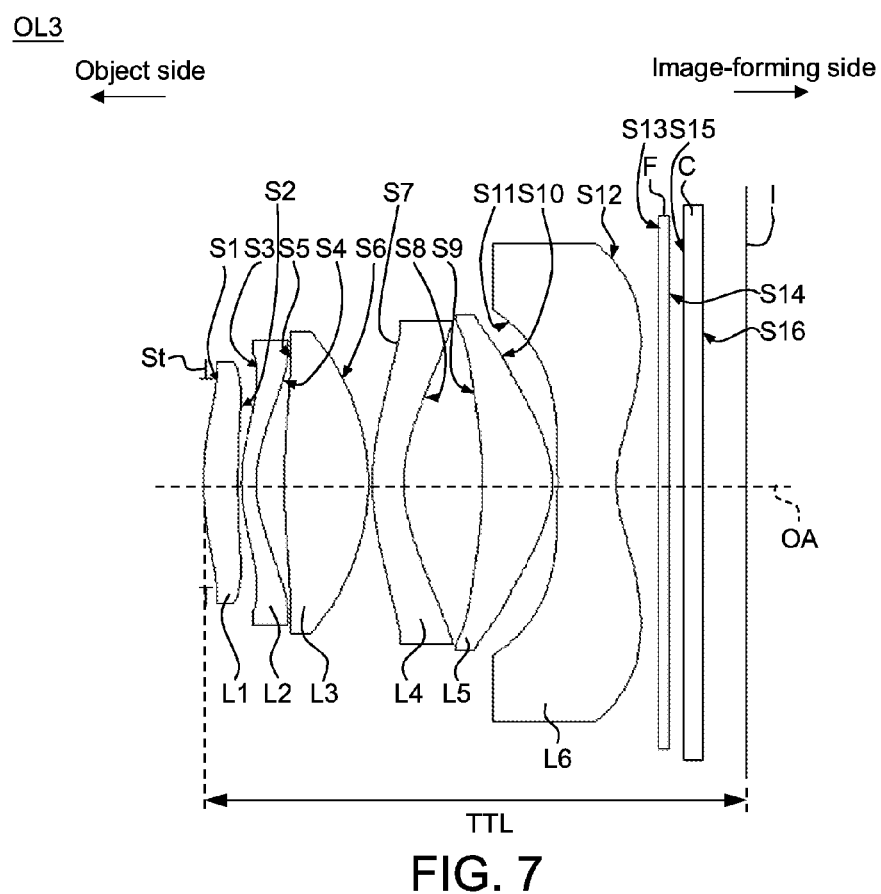
FIG. 7 shows an optical lens according the third embodiment of the present invention.

FIG. 7 shows the structure of an optical lens OL3 according the third embodiment of the present invention. The structure of the optical lens OL3 is about the same as those of the optical lenses OL1 and OL2 and mostly applies the same terms and labellings for the same components.

As shown in FIG. 7, the optical lens OL3 is different from the optical lenses OL1 and OL2 in that the object-side surface S1 of the first lens L1 of the optical lens OL3 may be a convex surface protruded toward the object side and has positive refractive power, and the image-side surface S2 is a concave surface indented toward the object side and has positive refractive power. Furthermore, the first lens L1 of the optical lens OL3 may be a lens having positive refractive power, including but not limited to a convex-concave lens having positive refractive power.

On the other hand, the object-side surface S3 of the second lens L2 of the optical lens OL3 may be a convex surface protruded toward the object side and has positive refractive power, and the image-side surface S4 may be a concave surface indented toward the object side and has positive refractive power. Furthermore, the second lens 12 of the optical lens OL3 may be lens having negative refractive power, including but not limited to a convex-concave lens having negative refractive power.

In addition, in another embodiment, the protection plate C may be integrated into the filter F, thereby omitting the arrangement of the protection plate C.

Table 5 lists the detail information of the optical lens OL3 according to an embodiment of this invention. If any one of the object-side surfaces S1, S3, S5, S7, S9 and S11 and the image-side surfaces S2, S4, S6, S8, S10 and S12 of the first lens L1 to the sixth lens L6 of the optical lens OL3 is aspheric, and the aspheric coefficients of the above-mentioned surfaces may be listed as indicated in table 6.

TABLE 5

| Effective focal length | Lens | Surface number | Curvature radius (mm) | Thickness (mm) | Refractive index | Abbe number |
|---|---|---|---|---|---|---|
| | | S | ∞ | −0.05 | | |
| 19.05 | L1 | S1 | 8.61 | 0.92 | 1.62 | 64 |
| | | S2 | 30.25 | 0.10 | | |
| −20.85 | L2 | S3 | 4.48 | 0.40 | 1.61 | 26.65 |
| | | S4 | 3.21 | 0.76 | | |
| 7.92 | L3 | S5 | 20.00 | 2.28 | 1.535 | 57 |
| | | S6 | −5.18 | 0.10 | | |
| −16.78 | L4 | S7 | 5.98 | 0.85 | 1.64 | 24 |
| | | S8 | 3.63 | 2.14 | | |
| 6.12 | L5 | S9 | −10.30 | 1.92 | 1.535 | 57 |
| | | S10 | −2.65 | 0.15 | | |
| −5.34 | L6 | S11 | −168.01 | 1.59 | 1.535 | 57 |
| | | S12 | 2.92 | 1.14 | | |
| | F | S13 | ∞ | 0.30 | 1.5233 | 54.517 |
| | | S14 | ∞ | 0.40 | | |
| | C | S15 | ∞ | 0.50 | 1.5167 | 64.167 |
| | | S16 | ∞ | 1.20 | | |
| | I | | ∞ | | | |

TABLE 6

| | K | A4 | A6 | A8 | A10 | A12 | A14 | A16 |
|---|---|---|---|---|---|---|---|---|
| S1 | −6.32 | 0.001132 | −0.000207 | −4.32e−6 | 5.37e−8 | −2.65e−8 | 0 | 0 |
| S2 | 0.00 | 0.00230 | −0.00058 | 2.38e−5 | −1.51e−6 | 4.77e−8 | 0 | 0 |
| S3 | −7.88 | −0.00192 | −0.000195 | 2.12e−5 | −2.01e−6 | 6.13e−8 | 0 | 0 |
| S4 | −4.54 | −0.00149 | −0.000103 | 1.82e−5 | −1.69e−6 | 4.79e−8 | 0 | 0 |
| S5 | 0.00 | 0.000434 | −0.000257 | 1.37e−5 | −2.68e−7 | 6.44e−9 | 0 | 0 |
| S6 | −10.35 | −0.00336 | 0.000090 | 1.23e−6 | −5.17e−7 | 2.00e−8 | 0 | 0 |
| S7 | −0.41 | −0.00503 | 0.000216 | −4.47e−6 | 9.90e−8 | −6.50e−9 | 0 | 0 |
| S8 | −5.66 | 0.000822 | −0.000158 | 1.31e−5 | −4.90e−7 | 5.10e−9 | 0 | 0 |
| S9 | 2.34 | 0.00282 | −0.000233 | 2.80e−5 | −1.56e−6 | 9.95e−9 | 8.52e−10 | 0 |
| S10 | −4.24 | −0.00193 | −0.000057 | 2.51e−5 | −1.18e−6 | −1.78e−8 | 1.42e−9 | 0 |
| S11 | 0.00 | −0.00369 | −0.000279 | 6.02e−5 | −4.58e−6 | 1.53e−7 | −1.9e−9 | 0 |
| S12 | −7.31 | −0.00383 | 0.000200 | −7.71e−6 | 1.61e−7 | −1.73e−9 | 7.16e−12 | 0 |

Additionally, Table 7 lists the effective focal lengths EFL, the F numbers Fno, the half angle views ω, the image heights Y, and the lens total lengths TTL of the optical lenses OL1, OL2, and OL3.

TABLE 7

| Parameters | Optical lens OL1 | Optical lens OL2 | Optical lens OL3 |
|---|---|---|---|
| EFL (mm) | 11.9 | 10.62 | 11.89 |
| Fno | 1.85 | 1.85 | 1.88 |
| ω (°) | 32.90 | 32.90 | 37.30 |
| Y (mm) | 8.00 | 8.00 | 8.00 |
| TTL (mm) | 16.40 | 16.30 | 14.74 |

Figure 8:
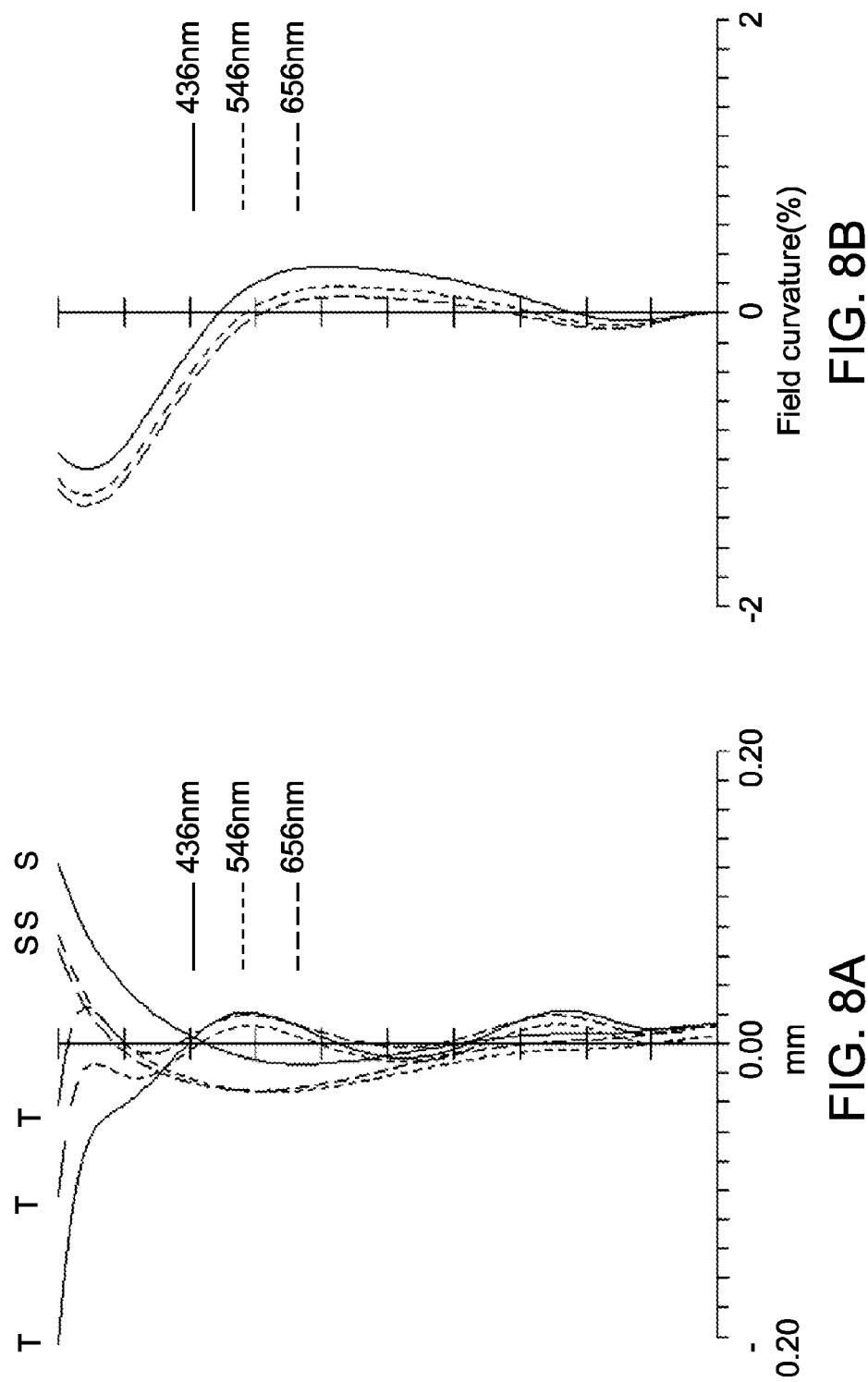
FIG. 8A and FIG. 8B show a field curvature chart and a distortion chart of the optical lens according to the third embodiment of the present invention respectively.

FIG. 8A shows the field curvature chart of the optical lens OL3. The curves T and S stand for the aberration of the optical lens OL3 to the tangential rays and the sagittal rays. As shown in the drawing, the tangential values and the sagittal values of light beams with wavelengths of 436 nm, 546 nm, and 656 nm are all controlled within favorable ranges.

FIG. 8B shows the distortion chart of the optical lens OL3. As shown in the drawing, the distortion values for light beams with wavelengths of 436 nm, 546 nm, and 656 nm are all set in the range of (−0.5%, +0.5%).

Figure 9:
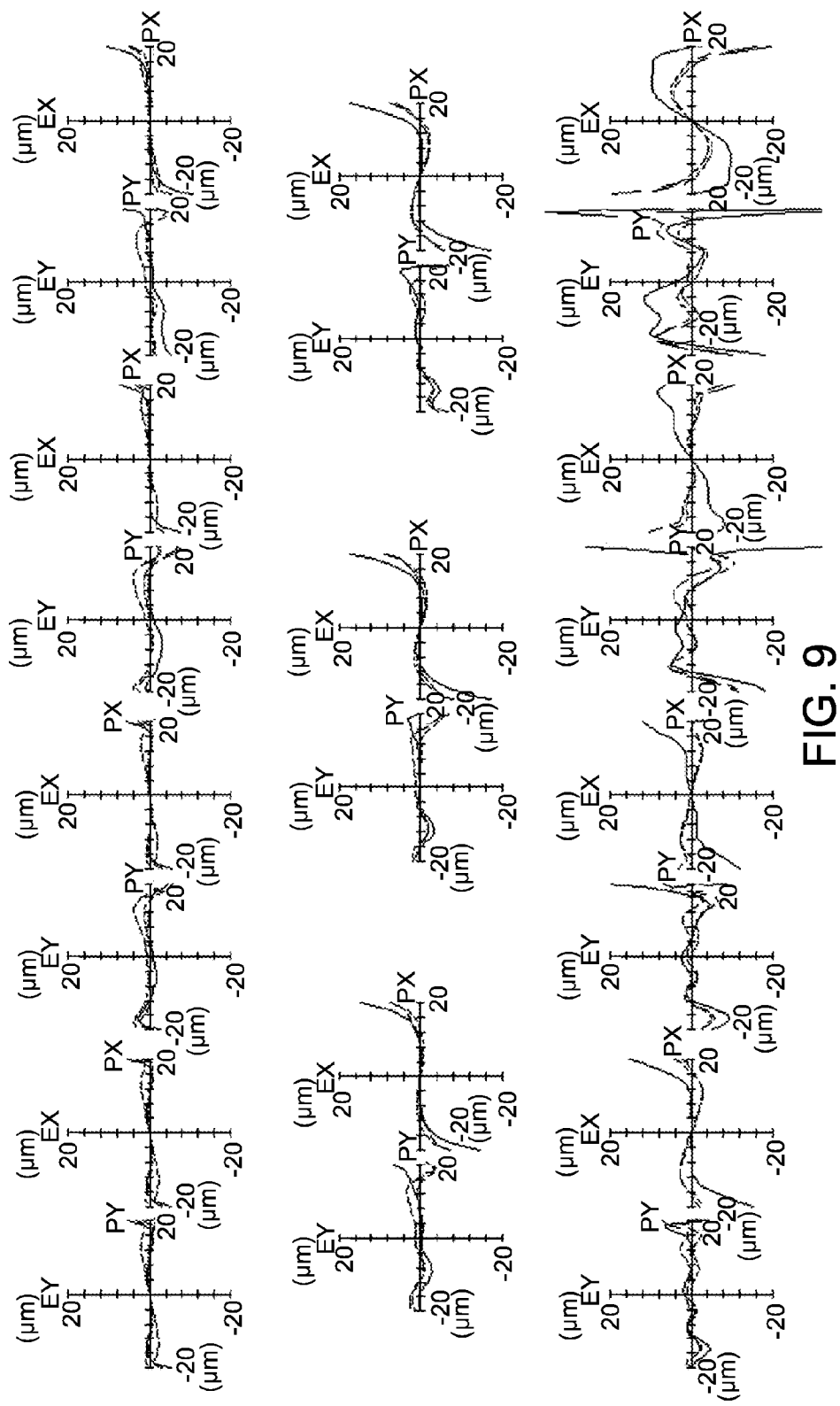
FIG. 9 shows a ray fan simulation chart of the optical lens according to the third embodiment of the present invention.

FIG. 9 shows a ray fan simulation chart of the optical lens OL3. The simulation data as shown in FIG. 9 are obtained according to different image heights Y with light beams having three different wavelengths of 436 nm, 546 nm, and 656 nm.

According to FIGS. 3A-6 and 8A-9, the spherical aberration, the field curvature, the distortion of the optical lenses OL1, OL2, and OL3 are nicely calibrated, and the analytical data of the ray fan simulation is within the standard range.

Figure 10:
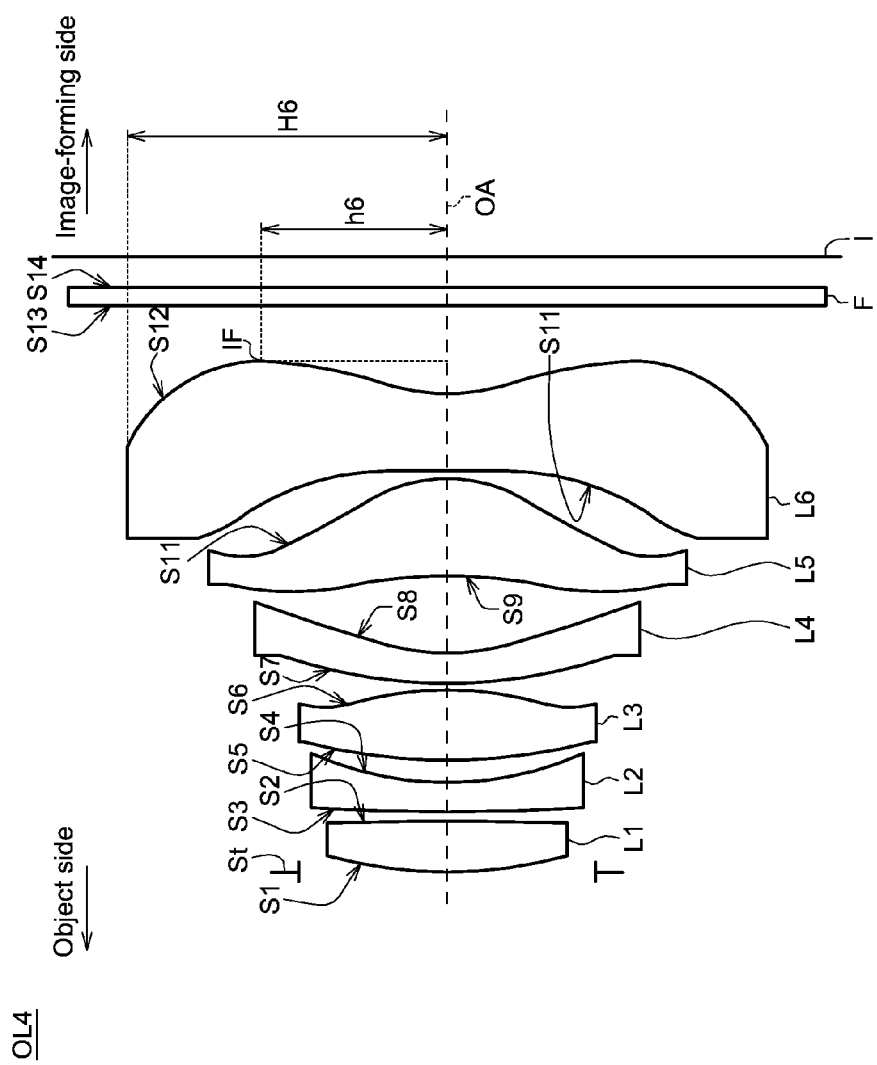
FIG. 10 shows an optical lens according the fourth embodiment of the present invention.

FIG. 10 shows an optical lens OL4 according the fourth embodiment of the present invention. The structure of the optical lens OL4 is about the same as that of the optical lens OL3 as shown in FIG. 7 and mostly applies the same terms and labellings for the same components. The image-side surface S2 of the first lens L1 of the optical lens OL4 may be a concave surface indented toward the image-forming side and has positive refractive power, and the object-side surface S3 of the second lens L2 of the optical lens OL4 may be a convex surface protruded toward the object side and has positive refractive power. Furthermore, the first lens L1 of the optical lens OL4 may be a convex-concave lens having positive refractive power, and the second lens L2 may be a convex-concave lens having negative refractive power; yet the above examples are not for limiting the invention.

Table 8 lists the detail information of the optical lens OL4 according to an embodiment of this invention. If any one of the object-side surfaces S1, S3, S5, S7, S9 and S11 and the image-side surfaces S2, S4, S6, S8, S10 and S12 of the first lens L1 to the sixth lens L6 of the optical lens OL4 is aspheric, and the aspheric coefficients of the above-mentioned surfaces may be listed as indicated in table 9.

TABLE 8

| Lens | Surface number | Curvature radius (mm) | Thickness (mm) | Refractive index | Abbe number |
|---|---|---|---|---|---|
| St | S | ∞ | 0.03 | | |
| L1 | S1 | 4.22 | 0.59 | 1.85 | 42.5 |
|  | S2 | 212.47 | 0.11 | | |
| L2 | S3 | 13.22 | 0.35 | 1.64 | 23.8 |
|  | S4 | 2.86 | 0.27 | | |
| L3 | S5 | 18.74 | 0.85 | 1.53 | 56.1 |
|  | S6 | −2.74 | 0.08 | | |
| L4 | S7 | 3.86 | 0.35 | 1.61 | 25.3 |
|  | S8 | 2.25 | 0.92 | | |
| L5 | S9 | −5.03 | 1.15 | 1.53 | 60.2 |
|  | S10 | −1.40 | 0.10 | | |
| L6 | S11 | −48.75 | 0.90 | 1.53 | 55.4 |
|  | S12 | 1.67 | 0.94 | | |
| F | S13 | ∞ | 0.21 | 1.52 | 64.2 |
|  | S14 | ∞ | 0.44 | | |
| I |  | ∞ | 0.00 | | |

TABLE 9

|  | S1 | S2 | S3 | S4 | S5 | S6 |
|---|---|---|---|---|---|---|
| K | −18.11 | −39.98 | 43.34 | −3.55 | 34.63 | −15.05 |
| A4 | 2.218e−02 | 6.039e−03 | −7.728e−03 | −6.300e−03 | 1.171e−02 | −7.148e−03 |
| A6 | −1.166e−02 | −6.818e−03 | −2.061e−03 | 2.530e−03 | 8.412e−04 | 7.217e−03 |
| A8 | 2.154e−03 | 5.571e−04 | 7.269e−04 | −5.717e−04 | −8.036e−05 | −8.745e−04 |
| A10 | −6.934e−04 | −3.746e−04 | 8.183e−05 | −1.174e−04 | 1.362e−04 | −7.866e−05 |
| A12 | 7.624e−05 | 1.768e−04 | −4.230e−05 | 3.042e−05 | 8.428e−06 | 8.845e−05 |
| A14 | −1.851e−05 | −3.605e−05 | 2.096e−05 | −1.374e−07 | −3.272e−06 | 6.726e−06 |
| A16 | 0.000e+00 | 0.000e+00 | 0.000e+00 | 0.000e+00 | 0.000e+00 | 0.000e+00 |

|  | S7 | S8 | S9 | S10 | S11 | S12 |
|---|---|---|---|---|---|---|
| K | −5.55 | −10.06 | 1.66 | −3.61 | −47.42 | −7.63 |
| A4 | −6.409e−03 | 1.000e−02 | 7.477e−03 | −1.700e−02 | −1.595e−02 | −1.839e−02 |
| A6 | 2.245e−03 | −3.047e−03 | 2.271e−03 | 2.812e−03 | −2.260e−03 | 2.789e−03 |
| A8 | −7.957e−04 | 5.767e−04 | 5.884e−04 | 9.735e−04 | 1.672e−03 | −3.463e−04 |
| A10 | 8.029e−05 | −1.120e−04 | −2.774e−04 | −2.977e−04 | −4.173e−04 | 2.562e−05 |
| A12 | −3.160e−06 | 1.360e−05 | 3.470e−05 | 4.310e−05 | 4.701e−05 | −1.386e−06 |
| A14 | 1.483e−06 | −6.243e−07 | −1.215e−06 | −3.508e−06 | −1.905e−06 | 5.923e−08 |
| A16 | −3.074e−07 | 1.356e−08 | −2.603e−08 | 1.150e−07 | 8.401e−10 | −1.393e−09 |

Figure 11:
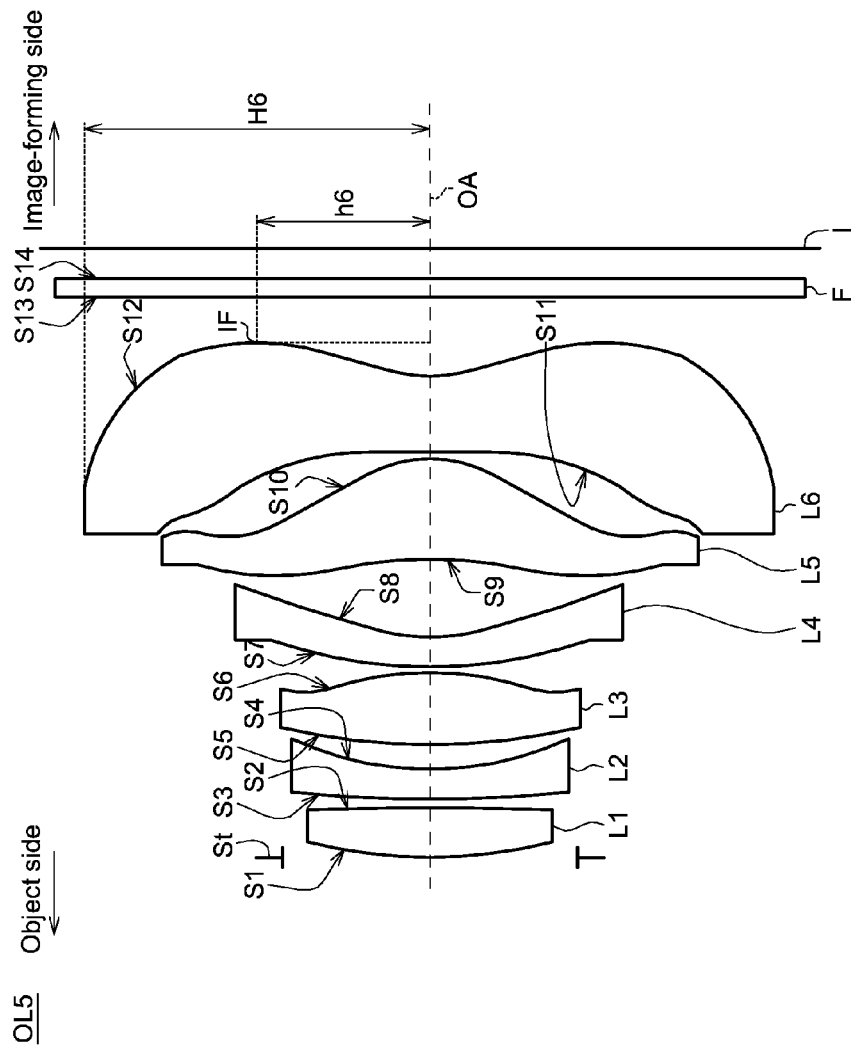
FIG. 11 shows an optical lens according the fifth embodiment of the present invention.

FIG. 11 shows an optical lens OL5 according the fifth embodiment of the present invention. The structure of the optical lens OL5 is about the same as that of the optical lens OL4 as shown in FIG. 10 and mostly applies the same terms and labellings for the same components.

Table 10 lists the detail information of the optical lens OL5 according to an embodiment of this invention. If any one of the object-side surfaces S1, S3, S5, S7, S9 and S11 and the image-side surfaces S2, S4, S6, S8, S10 and S12 of the first lens L1 to the sixth lens L6 of the optical lens OL5 is aspheric, and the aspheric coefficients of the above-mentioned surfaces may be listed as indicated in table 11.

TABLE 10

| Lens | Surface number | Curvature radius (mm) | Thickness (mm) | Refractive index | Abbe number |
|---|---|---|---|---|---|
| St | S | ∞ | 0.03 | | |
| L1 | S1 | 4.22 | 0.58 | 1.85 | 41.3 |
|  | S2 | 197.74 | 0.00 | | |
| L2 | S3 | 13.19 | 0.35 | 1.63 | 22.4 |
|  | S4 | 2.86 | 0.27 | | |
| L3 | S5 | 18.39 | 0.85 | 1.55 | 53.6 |
|  | S6 | −2.59 | 0.08 | | |
| L4 | S7 | 3.96 | 0.35 | 1.63 | 29.9 |
|  | S8 | 2.16 | 0.92 | | |
| L5 | S9 | −5.02 | 1.15 | 1.54 | 65.3 |
|  | S10 | −1.40 | 0.09 | | |
| L6 | S11 | −49.95 | 0.90 | 1.53 | 56.7 |
|  | S12 | 1.64 | 0.92 | | |
| F | S13 | ∞ | 0.21 | 1.52 | 64.2 |
|  | S14 | ∞ | 0.43 | | |
|  | I | ∞ | 0.00 | | |

TABLE 11

|  | S1 | S2 | S3 | S4 | S5 | S6 |
|---|---|---|---|---|---|---|
| K | −18.64 | −50.00 | 44.02 | −3.58 | 33.09 | −14.90 |
| A4 | 2.204e−02 | 5.927e−03 | −7.571e−03 | −6.388e−03 | 1.166e−02 | −6.975e−03 |
| A6 | −1.169e−02 | −6.858e−03 | −2.028e−03 | 2.520e−03 | 8.346e−04 | 7.269e−03 |
| A8 | 2.146e−03 | 5.512e−04 | 7.295e−04 | −5.679e−04 | −8.331e−05 | −8.671e−04 |
| A10 | −6.917e−04 | −3.752e−04 | 8.176e−05 | −1.149e−04 | 1.350e−04 | −7.769e−05 |
| A12 | 8.136e−05 | 1.760e−04 | −4.160e−05 | 3.125e−05 | 8.051e−06 | 8.867e−05 |
| A14 | −1.279e−05 | −3.734e−05 | 2.191e−05 | 5.441e−08 | −3.356e−06 | 6.806e−06 |
| A16 | 0.000e+00 | 0.000e+00 | 0.000e+00 | 0.000e+00 | 0.000e+00 | 0.000e+00 |

|  | S7 | S8 | S9 | S10 | S11 | S12 |
|---|---|---|---|---|---|---|
| K | −5.63 | −10.06 | 1.66 | −3.61 | −50.00 | −7.82 |
| A4 | −6.482e−03 | 1.003e−02 | 7.471e−03 | −1.701e−02 | −1.593e−02 | −1.841e−02 |
| A6 | 2.231e−03 | −3.040e−03 | 2.270e−03 | 2.811e−03 | −2.258e−03 | 2.789e−03 |
| A8 | −7.980e−04 | 5.775e−04 | 5.885e−04 | 9.733e−04 | 1.672e−03 | −3.463e−04 |
| A10 | 8.041e−05 | −1.119e−04 | −2.774e−04 | −2.977e−04 | −4.173e−04 | 2.562e−05 |
| A12 | −3.059e−06 | 1.362e−05 | 3.471e−05 | 4.309e−05 | 4.701e−05 | −1.386e−06 |
| A14 | 1.507e−06 | −6.173e−07 | −1.215e−06 | −3.508e−06 | −1.905e−06 | 5.922e−08 |
| A16 | −3.044e−07 | 1.533e−08 | −2.625e−08 | 1.149e−07 | 8.944e−10 | −1.394e−09 |

Figure 12:
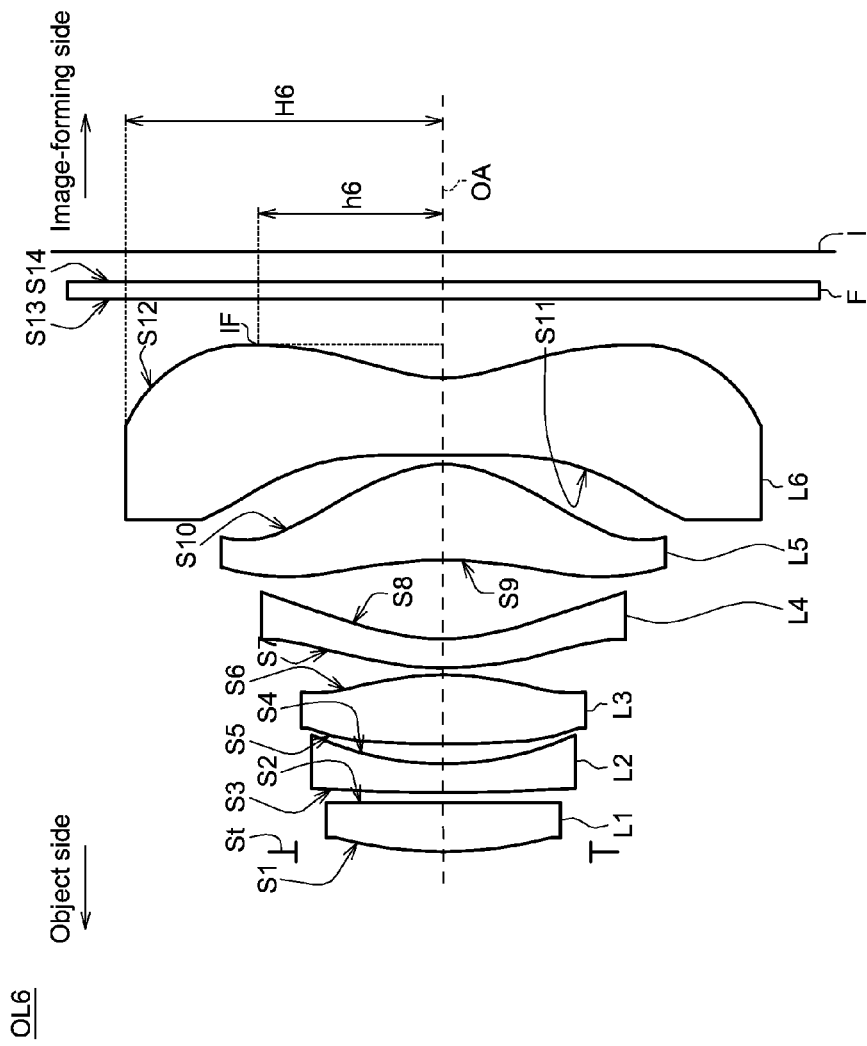
FIG. 12 shows an optical lens according the sixth embodiment of the present invention.

FIG. 12 shows an optical lens OL6 according the sixth embodiment of the present invention. The structure of the optical lens OL6 is about the same as those of the optical lenses OL5 and OL6 as shown in FIGS. 10 and 11, respectively, and mostly applies the same terms and labellings for the same components.

Table 12 lists the detail information of the optical lens OL6 according to an embodiment of this invention. If any one of the object-side surfaces S1, S3, S5, S7, S9 and S11 and the image-side surfaces S2, S4, S6, S8, S10 and S12 of the first lens L1 to the sixth lens L6 of the optical lens OL6 is aspheric, and the aspheric coefficients of the above-mentioned surfaces may be listed as indicated in table 13.

TABLE 12

| Lens | Surface number | Curvature radius (mm) | Thickness (mm) | Refractive index | Abbe number |
|---|---|---|---|---|---|
| St | S | ∞ | 0.03 | | |
| L1 | S1 | 4.23 | 0.59 | 1.85 | 48.3 |
|  | S2 | 188.53 | 0.00 | | |
| L2 | S3 | 13.41 | 0.35 | 1.64 | 27.1 |
|  | S4 | 2.85 | 0.24 | | |
| L3 | S5 | 19.09 | 0.84 | 1.52 | 52.6 |
|  | S6 | −2.84 | 0.08 | | |
| L4 | S7 | 3.70 | 0.35 | 1.59 | 19.1 |
|  | S8 | 2.28 | 0.95 | | |
| L5 | S9 | −5.03 | 1.15 | 1.54 | 62.9 |
|  | S10 | −1.40 | 0.11 | | |
| L6 | S11 | −50.00 | 0.93 | 1.53 | 54.4 |
|  | S12 | 1.63 | 0.95 | | |

TABLE 12-continued

| Lens | Surface number | Curvature radius (mm) | Thickness (mm) | Refractive index | Abbe number |
|---|---|---|---|---|---|
| F | S13 | ∞ | 0.21 | 1.52 | 64.2 |
|  | S14 | ∞ | 0.45 | | |
|  | I | ∞ | 0.00 | | |

TABLE 13

|  | S1 | S2 | S3 | S4 | S5 | S6 |
|---|---|---|---|---|---|---|
| K | −17.82 | −50.00 | 39.95 | −3.58 | 43.58 | −15.07 |
| A4 | 2.231e−02 | 6.348e−03 | −8.118e−03 | −6.419e−03 | 1.191e−02 | −7.458e−03 |
| A6 | −1.160e−02 | −6.629e−03 | −2.196e−03 | 2.472e−03 | 9.658e−04 | 7.064e−03 |
| A8 | 2.203e−03 | 6.393e−04 | 6.955e−04 | −5.686e−04 | −5.663e−05 | −9.183e−04 |
| A10 | −6.473e−04 | −3.482e−04 | 7.575e−05 | −1.029e−04 | 1.342e−04 | −8.443e−05 |
| A12 | 1.129e−04 | 1.829e−04 | −4.229e−05 | 3.701e−05 | 6.928e−06 | 8.980e−05 |
| A14 | 6.934e−06 | −3.685e−05 | 2.353e−05 | 8.471e−07 | −2.669e−06 | 7.883e−06 |
| A16 | 0.000E+00 | 0.000E+00 | 0.000E+00 | 0.000E+00 | 0.000E+00 | 0.000E+00 |

TABLE 13-continued

|  | S7 | S8 | S9 | S10 | S11 | S12 |
|---|---|---|---|---|---|---|
| K | −5.47 | −10.12 | 1.66 | −3.60 | −50.00 | −7.34 |
| A4 | −6.341e−03 | 9.964e−03 | 7.498e−03 | −1.701e−02 | −1.595e−02 | −1.820e−02 |
| A6 | 2.258e−03 | −3.054e−03 | 2.271e−03 | 2.813e−03 | −2.261e−03 | 2.794e−03 |
| A8 | −7.926e−04 | 5.764e−04 | 5.884e−04 | 9.736e−04 | 1.671e−03 | −3.462e−04 |
| A10 | 8.027e−05 | −1.119e−04 | −2.774e−04 | −2.976e−04 | −4.174e−04 | 2.562e−05 |
| A12 | −3.280e−06 | 1.361e−05 | 3.470e−05 | 4.310e−05 | 4.700e−05 | −1.386e−06 |
| A14 | 1.435e−06 | −6.231e−07 | −1.216e−06 | −3.507e−06 | −1.906e−06 | 5.923e−08 |
| A16 | −3.189e−07 | 1.280e−08 | −2.615e−08 | 1.150e−07 | 7.832e−10 | −1.393e−09 |

In addition, table 14 summaries the parameters from the embodiments of optical lenses OL1-OL6.

TABLE 14

| | Optical lens | | | | | |
|---|---|---|---|---|---|---|
| | OL1 | OL2 | OL3 | OL4 | OL5 | OL6 |
| EFL/TTL | 0.726 | 0.651 | 0.807 | 0.720 | 0.724 | 0.729 |
| F123/EFL | 0.815 | 0.774 | 0.880 | 0.823 | 0.771 | 0.869 |
| Fno | 1.85 | 1.85 | 1.88 | 2.30 | 2.30 | 2.30 |
| TTL | 16.40 | 16.30 | 14.74 | 7.28 | 7.26 | 7.24 |
| nd1 | 1.85 | 1.85 | 1.62 | 1.85 | 1.85 | 1.85 |
| vd1 | 40 | 40 | 64 | 42.50 | 41.30 | 48.30 |
| vd4 | 24.00 | 24.00 | 24.00 | 25.30 | 29.90 | 19.10 |
| |vd5 − vd6| | 0.00 | 0.00 | 0.00 | 4.80 | 8.60 | 8.50 |
| h6/H6 | 0.5512 | 0.5953 | 0.6114 | 0.574 | 0.537 | 0.584 |
| h6 | 3.66 | 3.84 | 4.06 | 2.18 | 2.17 | 2.23 |
| H6 | 6.64 | 6.45 | 6.64 | 3.80 | 4.04 | 3.82 |

According to the embodiments of the present invention, the optical lenses OL1, OL2, OL3, OL4, OL5, and OL6 can generate high-quality images with low resolution and low chromatic aberration while satisfying the conditions of reduced costs and sizes.

While the invention has been described by way of example and in terms of the preferred embodiment(s), it is to be understood that the invention is not limited thereto. On the contrary, it is intended to cover various modifications, equivalents, and similar arrangements and procedures, and the scope of the invention is intended to be limited solely by the appended claims.

What is claimed is:

1. An optical lens, in order from an object side to an image-forming side, comprising: a first lens, a second lens, a third lens, a fourth lens, a fifth lens and a sixth lens, the first lens, the third lens and the fifth lens are first type lenses, the second lens, the fourth lens and the sixth lens are second type lenses; wherein the first type lenses are diverging lenses and the second type lenses are converging lenses, or the first type lenses are converging lenses and the second type lenses are diverging lenses; and the optical lens satisfies at least one of the following conditions: $0.5 \leq EFL/TTL$, $EFL/TTL \leq 1$, $0.65 \leq F123/EFL$ and $F123/EFL \leq 1$, wherein EFL is an effective focal length of the optical lens, TTL is a distance between an object-side surface of the first lens and an imaging plane, and F123 is a total focal length of the first lens, the second lens and the third lens.

2. The optical lens as recited in claim 1, wherein the first lens is a glass lens.

3. The optical lens as recited in claim 1, wherein at least one of the second lens, the third lens, the fourth lens, the fifth lens and the sixth lens is a plastic lens.

4. The optical lens as recited in claim 1, wherein an imaging-side surface of the sixth lens is an aspheric surface with an infection point, a distance between the infection point and an optical axis is h6, a radius of the sixth lens is H6, and $h6/H6<1.0$.

5. The optical lens as recited in claim 1, wherein a refractive index of the first lens is nd1 and an Abbe number of the first lens is vd1, an Abbe number of the fourth lens is vd4, and $1.40 \leq nd1$, $35 \leq vd1$ or $vd4 \leq 40$.

6. The optical lens as recited in claim 1, wherein an Abbe number of the fifth lens is vd5, an Abbe number of the sixth lens is vd6, and $|vd5-vd6| \leq 10$.

7. An optical lens, in order from an object side to an image-forming side, comprising: a first lens having positive refractive power; a second lens having refractive power; a third lens having positive refractive power; a fourth lens having negative refractive power; a fifth lens having positive refractive power; and a sixth lens having negative refractive power; wherein the optical lens satisfies the following conditions: $0.5 \leq EFL/TTL$, $EFL/TTL \leq 1$, $0.65 \leq F123/EFL$, and $F123/EFL \leq 1$, wherein EFL is an effective focal length of the optical lens, TTL is a distance between an object-side surface of the first lens and an imaging plane, and F123 is a total focal length of the first lens, the second lens and the third lens.

8. The optical lens as recited in claim 7, wherein the first lens is a glass lens.

9. The optical lens as recited in claim 7, wherein at least one of the second lens, the third lens, the fourth lens, the fifth lens and the sixth lens is a plastic lens.

10. The optical lens as recited in claim 7, wherein at least one of the first lens, the second lens, the third lens, the fourth lens, the fifth lens and the sixth lens is an aspheric lens.

11. The optical lens as recited in claim 7, wherein an imaging-side surface of the sixth lens is an aspheric surface with an infection point, a distance between the infection point and an optical axis is h6, the sixth lens has a radius H6, and $h6/H6<1.0$.

12. The optical lens as recited in claim 7, further comprises the optical lens satisfies at least one of the following conditions: $1.30 \leq Fno$, $Fno \leq 2.80$ and $TTL \leq 20.0$ mm, wherein Fno is an F number of the optical lens.

13. The optical lens as recited in claim 7, wherein a refractive index of the first lens is nd1 and an Abbe number of the first lens is vd1, an Abbe number of the fourth lens is vd4, and $1.40 \leq nd1$, $35 \leq vd1$ or $vd4 \leq 40$.

14. The optical lens as recited in claim 7, wherein an Abbe number of the fifth lens is vd5, an Abbe number of the sixth lens is vd6, and $|vd5-vd6| \leq 10$.

15. The optical lens as recited in claim 7, wherein an imaging-side surface of the first lens has positive refractive power or negative refractive power, and/or an object-side surface of the second lens has positive refractive power or negative refractive power.

16. An optical lens, in order from an object side to an image-forming side, comprising: a first lens, a second lens, a third lens, a fourth lens, a fifth lens and a sixth lens, the first lens, the third lens, and the fifth lens are first type lenses, and the second lens, the fourth lens and the sixth lens are second type lenses; wherein the first type lenses are diverging lenses and the second type lenses are converging lenses, or the first type lenses are converging lenses and the second type lenses are diverging lenses; wherein the optical lens satisfies at least one of the following conditions: $0.5 \leq EFL/TTL$, $EFL/TTL \leq 1$, $0.65 \leq F123/EFL$ and $F123/EFL \leq 1$, wherein EFL is an effective focal length of the optical lens, TTL is a distance between an object-side surface of the first lens and an imaging plane, F123 is a total focal length of the first lens, the second lens and the third lens, the first lens is a glass lens, and at least one of the second lens, the third lens, the fourth lens, the fifth lens and the sixth lens is a plastic lens.

17. The optical lens as recited in claim 16, wherein an imaging-side surface of the sixth lens is an aspheric surface with an infection point, a distance between the infection point and an optical axis is h6, a radius of the sixth lens is H6, and $h6/H6 < 1.0$.

18. The optical lens as recited in claim 16, wherein a refractive index of the first lens is nd1 and an Abbe number of the first lens is vd1, an Abbe number of the fourth lens is vd4, and $1.40 \leq nd1$, $35 \leq vd1$ or $vd4 \leq 40$.

19. The optical lens as recited in claim 16, wherein an Abbe number of the fifth lens is vd5, an Abbe number of the sixth lens is vd6, and $|vd5-vd6| \leq 10$.

20. The optical lens as recited in claim 16, wherein an imaging-side surface of the first lens has positive refractive power or negative refractive power, and/or an object-side surface of the second lens has positive refractive power or negative refractive power.

* * * * *